United States Patent [19]

Burke

[11] 3,932,677

[45] Jan. 13, 1976

[54] COLLAGEN CASINGS FROM LIMED HIDE COLLAGEN

[75] Inventor: Noel I. Burke, Danville, Ill.

[73] Assignee: Tee-Pak, Inc., Chicago, Ill.

[22] Filed: Oct. 22, 1974

[21] Appl. No.: 517,277

[52] U.S. Cl................................. 426/277; 426/641
[51] Int. Cl.².................... A22C 13/00; A23J 1/10
[58] Field of Search ............ 426/57, 105, 140, 277, 426/278, 364, 641

[56] References Cited
UNITED STATES PATENTS

| | | | |
|---|---|---|---|
| 3,408,918 | 11/1968 | Talty et al............................ | 426/277 |
| 3,433,864 | 3/1969 | Highberger et al............. | 426/277 X |

Primary Examiner—James R. Hoffman
Attorney, Agent, or Firm—Paul Shapiro; Joseph E. Kerwin; William A. Dittmann

[57] ABSTRACT

This invention relates to a method for preparing a collagen casing from a collagen source which had been subjected to a rigourous liming for effectively completely liming the hide collagen. The fully limed hide collagen is soaked in a dilute edible acid having a pH below about 5.5 for a time sufficient to reduce the pH in the center of the hide to about 4 – 5.5, and then washing the neutralized hide with water until the pH of the supernatant after a 20 minute exposure with the hide, is within about 0.2 pH units of that of the incoming water. The hide is then ground and formed into a collagen slurry and processed in conventional manner into edible collagen casings.

3 Claims, No Drawings

COLLAGEN CASINGS FROM LIMED HIDE COLLAGEN

BACKGROUND OF THE INVENTION

Over a period of years synthetic sausage casings have been prepared from animal collagen which are particularly suited for the processing of pork sausages. As is known, sausage casings made from collagen are edible and they have the ability to transmit fat during the cooking of pork sausages and therefore have been found to be an acceptable substitute for natural casings.

In the manufacture of collagen casings a collagen source, typically hide collagen, is converted into a slurry containing from about 2 – 8% collagen by grinding the collagen source in a meat grinder and diluting with water. The collagen is acid swollen for releasing the collagen fibrils and destroying the identity of the individual fibers. The swollen collagen is extruded through an annular die to form a collagen tube. As the casing is extruded it is passed into a coagulating bath containing a dehydrating and deswelling agent, e.g., a concentrated solution of sodium sulfate or ammonium sulfate with a minor amount of alkali, e.g., sodium hydroxide to neutralize any free acid present in the casing. After the casing is coagulated, it is tanned suitably with an aluminum tanning agent for the purpose of providing sufficient strength to the casing to permit further processing. Often a second tanning operation is conducted using a dialdehyde as the tanning agent. The tanned casing is then washed, plasticized, and dried.

DESCRIPTION OF THE PRIOR ART

In the past it has been common to use a collagen source which has not been fully limed. In fact, the early processes required that the collagen source be unlimed if an edible casing was to be obtained. Through later developments, it was found that a partial liming of the hide collagen could be effected without incurring undesirable results in the casing if the liming were used for dehairing the hide and was confined to a period of about 3 to 12 hours. A maximum of four days' liming treatment could be tolerated in those processes but it was very difficult to obtain a casing which could be extruded and processed.

In my co-pending application having Ser. No. 347,293, and filed Apr. 2, 1973, casing is made from a collagen source which has been subjected to complete liming by preswelling the collagen source with a concentrated acid solution having a dissociation constant in water from about $1 \times 10^{-6}$ to about $1 \times 10^{-3}$. The swollen hide is then ground and formed into a collagen slurry and processed in conventional manner.

SUMMARY OF THE INVENTION

This invention relates to an improvement in a basic process for producing collagen casing from hide collagen source comprising the steps: forming a slurry containing from about 2 – 8% collagen, extruding the slurry through an annular die to form a tubular casing, coagulating, tanning, and drying the tubular casing thus formed.

The improvement in this basic process comprises the steps of using hide collagen which has been subjected to substantial liming as the collagen source. In this process, hide collagen which has been subjected to substantial liming is treated with a dilute, edible acid having a pH below about 5.5 for a time sufficient to reduce the pH in the center of the hide to about 4 – 5.5 and then washing the thus formed water-soluble calcium salts from the hide collagen until the pH of the effluent is within at least 0.2 pH units of the pH of the incoming water.

The basic advantage of the process is that it permits the use of a hide collagen which can be prepared substantially cheaper than any of the commercial process heretofore required for collagen casing manufacture and it permits wider flexibility in commercial collagen casing manufacturing plants because of the ability to store the collagen source for extended periods of time without bacterial degradation.

DESCRIPTION OF THE PREFERRED EMBODIMENTS

Collagen suitable for preparation of edible casings is obtainable from hide and tendon, although hide collagen is preferred for casing manufacture. Collagen is formed of a large number of fibers which, in turn, consists of a much greater number of fibrils of submicroscopic size. The fibrils have a diameter of the order of 10 – 50 angstroms and lengths ranging from several thousand up to several million angstroms. In the early patents, the production of edible collagen casings emphasize the necessity of using a collagen source which has not been subjected to a liming treatment. The reason which has been postulated is that the liming treatment allegedly prevents the bursting of collagen fibers to release the fibrils necessary for the formation of fibrillar films. As a result, the gel casings disintegrate in the coagulation bath or on further processing. Later patents have shown that satisfactory edible collagen casings can be prepared from hides which have been subjected to a limited liming, e.g., from 3 to 12 hours and then subjected to a deliming treatment and processed quickly. Generally, these hides are limed to effect partial dehairing of the hide and that is the extent of the operation. The hides are not shipped or stored in a saturated liming solution for an extended period of time. Thus, in the processing of partially limed hides, e.g., 3 to 12 hours and perhaps up to 4 days liming treatment, it is possible to neutralize the hide by treatment with an acid having a pH from 2.5 – 6.5 by treatment with a dilute solution of lactic acid for a period of about 10 to 12 hours, i.e., overnight. It is also easy to remove the water-soluble calcium salts from the hide by washing with water. The primary reason for the acceptability of this process was that the calcium had not penetrated the hide to any substantial degree and therefore was easy to remove. In practicing this invention, the liming period of the collagen source is at least 7 days and generally for periods up to several months.

In preparing hides which have been subjected to an extended liming period in a saturated lime solution for casing manufacture, the hides are first washed thoroughly with water to remove surface lime. Washing of the hide is continued until the effleunt from the hide has a pH of about 7. Although the washing step can be eliminated and the lime neutralized, it is much more economical to wash the hide removing substantial amount of lime from the hide rather than using an expensive acid.

After the hide has been washed and the surface lime removed the hide then is tumbled with a dilute aqueous acid having a pH below about 5.5 and preferably from about 4 – 5.5. The collagen source is kept in the dilute acid until the pH of the hide, at the center, is less than 5.5. The pH of the hide can be conveniently measured by phenol red.

A deliming solution having a pH below about 4 is not preferred because the casing begins to swell in these solutions and it becomes extremely difficult to remove the water-soluble calcium salts or excess acid from the hide. Generally, this period of acid tumbling may extend from about 4 to 20 hours for a hide having a thickness of about ⅛ inch to about 6 to 40 hours for a hide having a thickness of about ¼ inch. Soaking requires at least 40 hours.

Acids suitable for neutralizing the lime in the hide include lactic acid, hydrochloric acid, acetic acid, ethylene diamine tetraacetic acid, ammonium chloride, propionic acid, fumaric acid, etc. Ammonium chloride or other salts of weak bases and stong acid are preferred for neutralizing the excess lime in the hide collagen because it is easier to maintain an appropriate pH range to effect this neutralization.

After neutralization, the collagen is washed with water for removing substantially all of the water-soluble calcium salts from the hide. Washing is continued until the supernatant, after contact with the hide for a period of about 20 minutes, has a pH within 0.2 pH units of the pH of the incoming water. Usually the washing step is continued until the pH of the supernatant is about 6.7 – 6.8.

In the past, it had been commonplace to soak the partially limed hides for about 10 – 12 hours and then wash the water-soluble calcium salts from the hide. This process was permissible for partially limed hides but when completely limed hides were used a casing could not be manufactured. It was believed that the failure was due to the fact that the collagen had been subjected to liming rather than a defect in the deliming process. I now believe the flaw in the prior art processes was that no accurate measurement of the deliming step was made and it was assumed that deliming was effected by soaking with acid for a period of from 10 to 12 hours. Deliming requires substantially longer periods of time when the hides have been completely limed than when partially limed. As a result, a time period is not the governing factor for the deliming step but rather the measurement of the pH in the hide and that pH being below about 5.5, (preferably 4 – 5.5) is the important feature. This insures that all of the calcium in the hide has been neutralized and converted to a water-soluble salt.

This aspect was pointed out in my earlier filed case on the concentrated acid swelling of collagen in neutralizing collagen which had been subjected to an extended liming treatment. It was believed at that time that a concentrated acid was necessary for swelling the hide to enhance penetration of the acid into the hide and to provide a great enough concentration gradient to permit penetration of the hide by the acid and thereby effect neutralization of the hide. I have now found that it is possible to use a dilute acid solution having a pH below about 5.5 and preferably from about 4 – 5.5 for treating the completely limed collagen source for an extended period of time until the pH of the hide, at the center, is below about 5.5 and preferably anywhere from 4 – 5.5. This insures that complete neutralization of the calcium in the hide has taken place and is not left to estimate as was done in the previous prior art process.

After the hide has been completely neutralized by treatment with a dilute acid, the water-soluble calcium salts are washed from the hide. Washing of the hide to remove substantially all of the calcium salts is difficult when the hide is in a swollen state. This was one of the difficulties with my earlier process where a concentrated acid solution was added to swell the hide and effect neutralization of the calcium in the hide. However, in my previous process, most of the calcium in the hide had been removed by the preliminary neutralization and washing steps. Thus, only a minor proporation of calcium remained in the hide and was neutralized by the concentrated acid treatment. But the removal of this minor proportion of calcium in the hide was extremely important in the process of the hide for casing manufacture. In practicing the process of this invention washing of the hide is continued until the pH of the supernatant, after a contact period of 20 minutes with the hide, has a pH within 0.2 pH units of the incoming water. In some areas of the country, water is slightly acidic or basic and therefore a pH of 7 is not used as the cutoff pH. This step is particularly important in the processing of limed collagen for making a collagen slurry which can be processed into a collagen casing. In applying prior art processes to hides which were subjected to a complete liming treatment, acid neutralized by a treatment somewhat similar to the one described herein and then subjected to a water wash, there was no accurate measure for determining when the hides were washed thoroughly enough for permitting manufacture of collagen casing. Washing techniques in the prior art processes were left to operator discretion as to when washing of the hides was deemed complete. Usually this was a visual procedure and washing was discontinued when the effleunt was clear. In actual practice this is not an accepted procedure as the only way to tell if enough of the water-soluble calcium salts are removed is to measure the pH of supernatant after it has been in contact with the hide for an extended period.

The following examples are provided to illustrate the preferred embodiments of the invention and are not intended to restrict the scope thereof. All percentage are expressed as weight percentages.

EXAMPLE 1

Selected cattle hides from carcasses certified fit for human consumption, weighing about 65 – 75 lbs. each, are washed in a large volume of circulating cool (10°C) water to remove adhering blood. After washing the hides are fleshed without curing to remove adhering fatty and muscular debris from the flaying operation.

The washed and fleshed hides are treating by immersing the hides in a liming bath consisting of a saturated solution of calcium hydroxide containing about 5% solid particulate calcium hydroxide in about .5% sodium sulfhydrate for about 3 – 12 hours to effect partial dehairing of the hide.

After liming, the hides are removed from the liming bath and allowed to drain for a period of about ½ hour. The limed hides are gently squeezed between rubber rollers to remove all excess liming liquor. The hides are then cut and split in the plane of the hide into two approximately equal portions by weight. The upper or outer hide surface contains all of the hair, hair follicles, and sebaceous and sudorfic glands. The inner or corium layer consists essentially of collagen. The outer or hair-containing layer is discarded as unsuitable for use in the preparation of casing but may be used for formation of leather laminates or other coverings.

The corium splits are packed in a saturated lime solution and stored at temperatures preferably below about 5°C until processed.

For convenience at the processing plant, the limed hides may be stored in this lime solution to prevent bacterial growth until the hides are ready to be used. Sometimes this period is anywhere from 1 – 12 weeks or longer.

To prepare the hides for use in the manufacture of collagen casing, the corium splits are first washed with water to remove surface lime. Washing with water is continued until a liquor pH of about 7 is obtained when the liquor has been in contact with the hide for about 20 minutes. This step can be eliminated by neutralization with dilute acid as will be described in the next step except that washing of the hide is preferred for economic reasons.

The hides are delimed by converting the lime to a water-soluble calcium salt. Deliming is effected by tumbling the splits with a dilute aqueous acid solution, e.g. 0.5% lactic acid having a pH from about 4 – 5.5. Deliming of the hide is continued for about 20 hours at which time the acid end point in the center of the hide is less than 5.5. The end point is conveniently measured by phenol red.

After deliming, the hides are thoroughly washed with water to remove substantially all of the water-soluble calcium salts therein. Washing of the hide is continued for about 4 hours and completed only when the supernatant, when in contact with hide for about 20 minutes, has a pH of 6.7. The incoming water wash has a pH of 6.8.

Then the delimed and washed hides are chopped into small pieces, e.g., ¼ to 4 inches on a side and converted to a fine pulp by successive passes through a meat grinder. In this grinding operation, ice is mixed with the hide splits to maintain the temperature below about 20°C and preferably below about 10°C. After the hide has been passed through the meat grinder, sufficient water is added to the collagen pulp to produce a mixture consisting of about 90 – 95% water by weight.

The collagen pulp is then treated with sufficient dilute lactic acid to produce a pH of about 2.5 – 3.7 and is stored overnight at a temperature of 3°C to effect swelling of the collagen. At the end of the overnight soaking period, the collagen has swollen and taken up all of the water in the slurry. The swollen collagen is mixed with additional water and acid to produce a homogenous paste containing about 4% collagen and 1.2% lactic acid (to maintain a pH of 2.5 – 3.7). The paste is further homogenized, filtered to remove solid contaminant and deaerated.

The solution is pumped under pressure through an extrusion die such as the one described in Becker U.S. Pat. No. 2,046,541 into a coagulating bath consisting of 42% ammonium sulfate (sodium sulfate can also be used) in water. When the casing is extruded as a thin-walled tube into this concentration of ammonium sulfate, the collagen fibrils are dehydrated and collapsed to form a film which is sufficiently coherent for further processing. Generally the coagulation bath is circulated both inside and outside the tube to maintain the tube in an inflated condition and to insure proper coagulation of the casing both on the inside and outside.

From the coagulation bath, the casing is passed into a first tanning bath comprising an aqueous solution containing about 5% aluminum sulfate expressed as $Al_2(SO_4) \cdot 14H_2O$, 4% sodium citrate and 4% sodium hydroxide. This tanning bath is formulated so that the sodium citrate (or citric acid) forms a complex with the aluminum sulfate and the sodium hydroxide neutralizes the portion of the aluminum-citrate complex to render the same about one-third to two-thirds basic. This results in the tanning bath having a pH of about 4. The bath is maintained at a temperature of about 15° – 30°C and the residence time of the casing in the bath is adjusted to about 5 minutes.

After the casing is tanned with the aluminum complex, it is passed through one or more wash baths to wash out any unreacted tanning or hardening agent and then passed through a second tanning bath containing 200 ppm glutaraldehyde in water. Glutaraldehyde tanning bath has a pH of about 4.3 and is maintained at a temperature of about 15° – 30°C. The residence time of the casing in the glutaraldehyde bath is about 3 minutes.

After the casing has been subjected to a second tanning operation, it is removed from the bath and passed through one or more wash baths to wash out any unreacted glutaraldehyde. The casing is then passed through a plasticizing bath containing about 3% glycerin, 0.1% sodium bicarbonate and sufficient sodium hydroxide is added to raise the pH to 8. The residence time of the casing in the bath is about 3 minutes.

After the casing leaves the plasticizing bath, it is dried, shirred and packaged. The casing shirrs well and has excellent pan frying and deep frying characteristics.

EXAMPLE 2

The procedure of Example 1 is followed except that ammonium chloride is used in place of the lactic acid for neutralizing the lime present in the hide. A 2% solution of ammonium chloride in water has a pH of 4.3 and is extremely effective and convenient to use for neutralizing the lime in the hide. The tumbling period of the hide in the ammonium chloride solution is about 8 hours and the tumbling treatment is terminated when the hide has a pH of 4.7.

Casing made in accordance with the same procedures of Example 1 as acceptable process strength for commercial operation and the pan frying and deep fat frying of the resulting casing is good.

EXAMPLE 3

The procedure of Example 1 is repeated except that the hides are soaked, not tumbled, in the dilute lactic acid for about 12 hours. The water-soluble calcium salts in the hide are removed by washing with water for a period of about 3 hours. A slurry is prepared in accordance with procedure of Example 1 and processed accordingly. The casing does not extrude into a continuous film and the casing breaks in the middle of the processing operation.

I claim:

1. A process for preparing an edible collagen casing from a hide collagen source which has been completely limed for a period from seven days to several months which comprises deliming the completely limed hide collagen by treating said hide with a dilute, edible acid at a pH of about 4.0 to 5.5 for a time sufficient to reduce the pH in the center of the hide to less than about 5.5 to form water soluble calcium salts from the lime in said hide, washing the water soluble calcium salts from the hide collagen with water until the pH of the supernatant water after a 20-minute exposure to said hide is within at least 0.2 pH units of the pH of the incoming water, forming a soft extrudable slurry from the neutralized and washed hide collagen containing about 2 – 8% collagen, extruding said slurry through an annular die to form a tubular edible collagen casing, coagulating, tanning, and drying the casing thus formed.

2. The process of claim 1 wherein the pH in the center of the hide is reduced to about 4 – 5.5.

3. The process of claim 1 wherein the completely limed hide collagen is neutralized by treatment with aqueous ammonium chloride solution.

* * * * *